United States Patent [19]

Grzybowski

[11] Patent Number: 5,217,530

[45] Date of Patent: Jun. 8, 1993

[54] PERFORMANCE-MODIFIED ASPHALT PAVEMENTS USING RECYCLED ROOFING WASTE

[75] Inventor: Ken F. Grzybowski, Temple Terrace, Fla.

[73] Assignee: ReClaim, Inc., Tampa, Fla.

[21] Appl. No.: 835,212

[22] Filed: Feb. 13, 1992

[51] Int. Cl.$^5$ .................................................. C08L 95/00
[52] U.S. Cl. ............................................................ 106/202
[58] Field of Search ............................... 106/281.1, 282

[56] References Cited

U.S. PATENT DOCUMENTS

| | | | |
|---|---|---|---|
| 4,325,641 | 4/1982 | Babus et al. | 366/18 |
| 4,706,893 | 11/1987 | Brock | 241/23 |
| 4,726,846 | 2/1988 | Jackson et al. | 106/284.01 |
| 4,908,064 | 3/1990 | Plummer | 106/281.1 |

Primary Examiner—David Brunsman
Attorney, Agent, or Firm—Jansson & Shupe, Ltd.

[57] ABSTRACT

An improved asphalt pavement composition including about 3-8 parts by weight asphaltic bitumen binder; about 62-96 parts by weight aggregate; and about 0.5-30 parts by weight recycled roofing waste as a predominate source of asphalt, stabilizing filler and reinforcing fiber. Use of recycled asphalt roofing waste at any level provides an excellent pavement composition which exhibits enhanced performance properties. A non-renewable resource is thus recycled, while providing an environmentally-safe alternative to landfill disposal.

17 Claims, No Drawings

PERFORMANCE-MODIFIED ASPHALT PAVEMENTS USING RECYCLED ROOFING WASTE

FIELD OF THE INVENTION

This invention is related generally to asphalt pavements and, more particularly, to performance-modified asphalt pavement compositions.

BACKGROUND OF THE INVENTION

Casual observation shows roadway construction to be an on-going exercise in most communities, especially in wet climate areas and those susceptible to repeated freeze-thaw cycles. Engineering and performance failures of pavement compositions eventually require corrective action. Remedial measures to repair cracks, potholes and the like offer only a short-term solution to the problem of distressed roadways. Ultimately, complete restoration is necessary, but only at great cost and inconvenience, in terms of time, disrupted traffic patterns, and over-extended tax revenues.

A concurrent problem relates to the accumulation of asphalt roofing wastes. Each year, according to a recent estimate, approximately 92 million squares of roofing shingles are produced in the United States. A square, by definition, is material sufficient to cover 100 square feet of surface area including overlap (typically, 240 sq. ft. without overlap), typically contains 80 shingles, and depending upon the particular shingle composition weighs between 200-250 pounds. Shingles produced after 1980 are 20-30% asphalt by weight, with the remainder comprising fiberglass mat, roofing granules, filler, and back-surfacing materials. Those produced prior to 1980 contain roughly 1.5 times the amount of asphalt.

Significant waste accompanies the manufacture of such materials. Broken and defective shingles are discarded. Production of standard three-tab shingles produces cut-outs and trimmings which total nearly 1% of their total weight. Based on annual shingle production figures (and using post-1980 composition data), approximately 100,000 tons of shingle cut-outs/trimmings and 25,000 tons of asphalt are generated each year. The total amount of broken and defective shingles discarded annually is of a comparable magnitude.

An additional facet of the situation is that a significant amount of previously-applied shingles are recovered each year. The typical residential roof may be re-shingled two or more times before all old shingles are removed. On an annual basis, approximately 2.1 million tons of asphalt are generated each year in this manner—in addition to the manufacturing wastes referenced above.

The annual amount of waste attributable to shingles provides only a glimpse as to the real scope of the problem. Other types of asphalt roofing materials include asphalt-saturated organic felts, asphalt-impregnated glass and polyester mats, rolled roofing products such as ply sheets, modified bitumen membranes and the like, as well as commercial build-up roofs (alternating layers of asphalt and prepared rolled roofing products on commercial buildings). The manufacture and replacement of each has associated with it a significant amount of waste. (For the purpose of this discussion, the term "asphalt roofing wastes" will be used to refer to waste generated through the manufacture and/or disposal of these and other materials.)

For many years, asphalt roofing wastes have been land-filled. What once seemed to be a safe and sound "solution" spawned a variety of more worrisome concerns, foremost among which is the creation of permanent landfills—land which over time becomes non-reclaimable. Furthermore, with an increasingly-larger population and ever-growing volume of solid wastes, the number of available landfills has dwindled to the point where most states now ban certain types of refuse. For these reasons, it is no longer environmentally-wise or economically-feasible to continue landfill disposal of asphalt roofing wastes.

The search for a beneficial alternative to land-fill disposal of asphalt roofing wastes has been on-going concern in the art. One such use is in the field of roadway construction. By way of background, pavements are typically only about 4-6% asphalt binder by weight, the remainder comprised primarily of aggregate. Conventional approaches, which have been used with very limited success, merely attempt to offset the amount and cost of asphalt used with recycled roofing waste.

In U.S. Pat. No. 4,325,641, a method of processing asphalt shingles is described, whereby a hot mix pavement is produced in which about 50% by weight of the asphalt component may be substituted with asphalt shingles. (For the purpose of this discussion, a "hot-mix" asphalt pavement is comprised of aggregate mixed and coated with an asphalt binder; heat applied prior to mixing dries the aggregate and gives the asphalt sufficient fluidity.) A similar approach, discussed in U.S. Pat. No. 4,706,893, also relates to a method of processing asphalt shingles such that only about 40% of the asphalt component—or about 2% of the total weight of the composition—may be derived from shingle material.

However, the prior art has associated with it a number of obvious and significant problems and deficiencies. Most are related to pavement performance and result from the roofing wastes used therewith. Asphalt pavements of the prior art may be characterized by a number of predictable performance deficiencies, which, if left uncorrected, may eventually lead to complete roadway failure.

A major problem is that methods and compositions of the prior art use roofing waste merely as an asphalt substitute. While the environmental and economic benefits derived from diverting a hazardous waste stream are obvious, use of it in this manner has not contributed anything to pavement performance or the engineering properties of the asphalt component.

A related problem of the prior art stems from the fact that a pavement composition must be designed in such a manner that pertinent physical properties may be measured with some degree of precision and correlation to actual roadway performance. Many government units, including state highway agencies, have adopted such an engineering-based approach. (Several are used, but the most widely-accepted approach is known in the art as the "Marshall Method".) As a result, a pavement composition based solely on a "recipe" formulation which does not correlate well to eventual performance is undesirable. It is an advantage in the context of a competitive bidding process to be able to provide comparative data to support improved performance properties.

The problem arises in that pavement compositions of the prior art which incorporate roofing waste material do not yield test data which, in any way, indicate improved performance—whether or not compared to pavements without such materials. The lack of such favorable data is reflected in the marginal performance eventually observed.

Another major problem relates to the fact that an asphalt pavement is predominantly asphalt-coated aggregate. The aggregate is of a size, cut, and porosity which imparts to it a relatively large surface area per unit volume. In order to ensure adequate coating, a high-penetrating asphalt is needed, one which is readily fluid at process temperatures of 300°–400° F. The temperature-stable, oxidized asphalts typically found in roofing products are not readily fluid within this temperature range and present problems and subsequent mix design difficulties if substituted for conventional paving grade asphalt. As a result, lower-viscosity paving grade asphalts and/or recycling oils must be used to offset the increased viscosity caused by any roofing waste present.

With low asphalt viscosity, the aggregate surface is coated with only a thin film of asphalt which is quite susceptible to oxidative aging. A minimal coating also increases the degree of void space between individual aggregate particles. High void content, in turn, increases the permeability of the composition to air and water, further causing premature asphalt hardening.

Another deficiency of the prior art is "flushing"—the phenomenon of asphalt actually oozing out of a pavement composition. The low viscosity and high-penetration qualities of an asphalt which promote aggregate coating will cause a pavement to become slick and oily at normal summer temperatures. Conventional wisdom indicates that limiting the amount of roofing waste in a pavement composition will lower viscosity and improve processing. However, such limitations do nothing to alleviate flushing and related stability concerns.

Performance deficiencies of the prior art are, in part, attributable to the fact that the roofing shingles used are about ⅛ inch or larger in cross-section. At this size the roofing waste does not become fully integrated into the asphalt component. Rather, it behaves as a sticky aggregate, causing additional mix design difficulties.

In summary, there are a considerable number of drawbacks and problems relating to the use of recycled asphalt roofing waste in a roadway pavement composition. There is a need for a composition which not only provides an economic alternative to landfill disposal, but also a pavement with enhanced performance properties.

OBJECTS OF THE INVENTION

It is an object of this invention to provide an improved asphalt pavement composition overcoming some of the problems and shortcomings of the prior art.

Another object of this invention is to provide an improved asphalt pavement composition in which recycled asphalt roofing waste is fully integrated to enhance asphalt engineering properties and pavement performance.

Another object of this invention is to provide an improved asphalt pavement composition such that pertinent physical properties thereof are improved through the incorporation of asphalt roofing waste, may be measured by accepted methods, and correlated to actual improvements in roadway performance.

Another object of this invention is to provide an improved asphalt pavement composition such that asphalt levels, viscosity, and aggregate coating may be increased without simultaneously incurring performance problems.

Another object of this invention is to provide an improved asphalt pavement composition such that recycled asphalt roofing waste may be used without further requiring higher levels of lower viscosity asphalts and/or recycling oils.

Another object of this invention is to provide an improved asphalt pavement composition whereby low void content is maintained and pavement durability is enhanced, without incurring an increase in the incidence of flushing and related stability problems.

These and other important objects will be apparent from the following description of this invention.

SUMMARY OF THE INVENTION

This invention is an improved pavement composition. It overcomes certain well-known problems and deficiencies, including those outlined above, while providing a solution to the growing environmental concerns about landfill disposal. An important aspect of this invention is the use of recycled asphalt roofing waste not merely as a source of asphalt, but to modify the stability and durability of a roadway pavement. That is, use of such waste materials represents a novel and unexpected approach to enhanced performance of conventional mix designs.

This invention is an improved asphalt pavement composition including (1) about 3–8 parts by weight asphaltic bitumen binder, (2) about 62–96 parts by weight aggregate; and (3) about 0.5–30 parts by weight recycled roofing waste. The roofing waste is a predominant source of asphalt and provides stabilizing filler and re-enforcing fiber such that pavement performance is enhanced. (The term "predominant", as used herein and in conjunction with the asphalt, filler, and fiber derived from recycled asphalt roofing waste, refers to the unique controlling influence it exerts upon a pavement composition at any level of incorporation therein and with respect to the functional qualities and performance characteristics thereby exhibited.)

The roofing waste may be obtained from sources such as manufacturing excess, recovered asphalt roofing products, discarded products recovered from a landfill, and mixtures thereof. In preferred embodiments, the roofing waste is about 2–15 parts by weight of the composition and comprises 5–15 percent by weight fiber and about 40–70 percent by weight filler. Preferably, the roofing waste is the dominant source of filler and fiber and is sized-graded to a dimension less than about 1.0 mm.

In highly preferred embodiments, the roofing waste is size-graded to a range of about 0.21–0.85 mm and is substantially the only source of filler and fiber in the pavement composition.

For use in conjunction with the recycled waste component of this inventive composition, the asphaltic bitumen binder is preferably of a viscosity such that it has a penetration number in the range of about 15–200. In highly preferred embodiments, the asphaltic bitumen binder is more viscous, having a penetration number in the range of about 20–50. Likewise, the aggregate component of this composition is preferably crushed stone and sized-graded to a dimension less than about 19.0 mm.

As previously noted, this inventive composition is distinguishable from the prior art primarily in that recycled asphalt roofing wastes are incorporated not merely as an asphalt substitute, but to modify and improve the physical properties of a roadway pavement. Such wastes are generated through the manufacturing processes for various asphalt roofing products and through replacement and repair of existing roofing applications. To the extent such wastes are recovered from landfill facilities, this invention also represents a means toward land reclamation.

Production of asphalt roofing materials represents a significant percentage of petroleum consumption. Recycling what would otherwise be considered refuse decreases use of a non-renewable resource. Moreover, the energy and cost required to produce asphalt is saved, further lowering energy consumption and the expenditure of scarce government funds. Repeated conflicts with major oil-producers abroad and record budget deficits here at home underscore the potential impact of this invention.

Asphalt pavements of the present invention, unlike those of the prior art, demonstrate significant and measurable improvements in engineering performance properties at high binder levels. For example, flow and stability measurements, as well as voids content, may be readily-obtained and correlated to improved roadway performance. Availability of meaningful data of this sort is a considerable improvement over the prior art and provides a tremendous marketing and sales advantage.

Roofing waste is distinct from conventional paving asphalts. The uniqueness is attributable to the manufacturing process, wherein the asphalt is typically heated to temperatures near 500° F. and treated with dry air. Various polymerization and condensation reactions compositionally alter the asphalt, providing a useful high-viscosity, low-penetration asphalt.

When used as described herein, recycled asphalt roofing waste serves as a source of a temperature-stable asphalt, as well as performance-enhancing and mix-stabilizing filler and fiber. Because such wastes include all these ingredients, efficiency and economy in pavement production is promoted. Furthermore, beneficial characteristics are conveniently imparted to the entire pavement composition.

Conventional pavement compositions which include recycled asphalt roofing wastes are designed in such a way as to offset the hardness and viscosity of such material—qualities perceived as undesirable. That is, low-viscosity, high-penetration asphalts and/or oils are added to compensate for roofing wastes present and maintain accepted penetration and coating properties. For these reasons, it is conventional wisdom that asphalt can comprise no more than 6% of a pavement composition, of which only about 50% of the asphalt component may derive from roofing waste.

The recycled roofing waste of this invention would not seem appropriate for use in a pavement composition. It would seem improbable that the quantities of asphalt roofing wastes considered herein could be used effectively in a pavement composition. It would also seem improbable for reasons explained above that such wastes would provide the pavement composition with the coating, stability, and durability properties desired.

The use of recycled asphalt roofing wastes in the manner and to the extent disclosed herein is contrary to the art. The enhanced engineering performance properties obtained were quite unexpected. Without advancing any one explanation it appears the fine gradations of filler and fiber, as specified herein, permit inclusion of a larger asphalt component than otherwise possible. Additional, higher-viscosity asphalt, in turn, provides the enhanced engineering performance properties observed.

The roofing waste discussed herein contains asphalt-coated inorganic filler and re-enforcing fiber in amounts sufficient to act synergistically with the asphalt component to enhance pavement performance over a wide temperature range. The exact nature of each depends on the source of the roofing waste utilized. Generally, fibers include and are composed of cellulose, fiberglass, and various synthetic materials such as polyester. Fillers may include limestone, sand, and other such materials.

Conventional asphalt pavements may incorporate fiber and filler, but only at increased production cost. Unfortunately, higher cost translates into decreased sales, irrespective of performance. Because the composition of this invention utilizes an indigenous source of filler and fiber utility and performance are enhanced without associated higher costs.

In cold temperatures and through freeze-thaw cycles, filler and fiber also prevent thermal-cracking. In warm temperatures the same materials coupled with a less temperature-susceptible asphalt minimize rutting, surface failures associated with fatigue stresses and strains, and load-induced deformations caused by high vehicular traffic.

As referenced above, the unique synergy between filler, fiber, and more temperature-stable asphalt is believed to be responsible for the improved performance observed. Greater asphalt viscosity provides a thicker asphalt film around each aggregate particle, the beneficial results of which are two-fold. First, the asphalt is less susceptible to oxidative processes, in that neither water nor air permeate and age the film prematurely. Second, a thicker film effectively lowers the voids content between aggregate particles, thereby decreasing the degree of water and air circulation through the aggregate matrix and further lessening the susceptibility of the asphalt component to premature aging.

Furthermore, the present invention allows more binder to be used than would otherwise be permissible. Surface coating and aggregate adhesion are improved, providing a more stable and durable pavement. More viscose asphalt, as well the presence of filler and fiber materials, prevents flushing. Higher asphalt levels increase adhesion and provide a pavement less susceptible to stripping. As a result, expensive anti-strip agents of the prior art are no longer needed.

The procedures for determining the various performance properties mentioned above are well-known to those skilled in the art. Many state agencies publish test methods and criteria on which to evaluate eventual field performance. Reference is made to the American Association of State Highway and Transportation Officials (AASHTO) and American Society for Testing and Materials (ASTM) standard test procedures, as well as the Asphalt Institute and other authorities on mix design methods.

Suffice it to say, for the purpose of this discussion, stability and flow measurements—two criteria under the widely-accepted Marshall method—are obtained by applying force to a compacted, cured pavement specimen. Marshall stability is measured in terms of pounds-force (LBF) required to shatter the specimen, while Marshal flow values are expressed in terms of 1/100 inch, the degree of specimen deformation observed during the stability test.

Generally, with regard to stability, high Marshall values are desirable at low asphalt levels. With regard to Marshall flow, values indicating low deformation upon compression, at any asphalt level, are desirable. Compositions of this invention are routinely tested against pavements of the prior art. As shown in Example 5, below, one embodiment of this invention provides a nearly 200% increase in Marshall stability when compared to a similar conventional mix design without incorporation of recycled asphalt roofing waste.

Successful asphalt pavement compositions may be formulated with a wide variety of asphaltic binders, as distinguished and characterized by penetration number and viscosity. Whereas pavements of the prior art have been necessarily restricted to the use of binders with a penetration number greater than 100 to compensate for a perceived deficiency in the roofing waste material, binders used in conjunction with this invention may have a penetration number as low as 15 (low penetration, high viscosity) to 200 (high penetration, low viscosity). While binders with penetration numbers of about 20–50 are preferred, a variety of binders may be utilized to provide pavements suitable for a wide range of geographic and climatic conditions.

The contents of the recycled asphalt roofing wastes utilized by this invention vary from one roofing product to another, depending on the type and manufacturer. However, homogeneity and specificity are achieved with respect to the asphalt, filler, and fiber content, such that measurable and reproducible engineering performance properties are achieved. It should be emphasized that the overall portions and composition of the recycled asphalt roofing waste utilized approximate the weighted average of all types of waste marketed and indigenous to a given locale. It is within this parameter that the roofing waste component of this invention comprises about 5–15 percent by weight fiber, and about 40–70 percent by weight filler.

The roofing waste is size-graded to maximize the synergistic effect of the asphalt, fiber, and filler ingredients. Preferably, it is dimensioned less than about 1.0 mm. In highly-preferred embodiments, the waste material is dimensioned between 0.21–0.85 mm. (Dimensions are those corresponding to ASTM standard sieve designations.) Finer gradations result in a loss of reinforcing fiber activity. If the waste is dimensioned beyond the preferred upper-limit agglomeration occurs, preventing homogeneous dispersion and attainment of the desired engineering properties. The preferred recycled asphalt roofing waste is available from ReClaim, Inc. of Tampa, Fla. under the ReActs label.

Aggregate performs a dual role within the context of a pavement composition. It has a performance function, in that it stabilizes the composition by absorbing stress and strain. From a purely aesthetic prospective, aggregate also provides any pavement with a pleasing, uniform appearance. The choice of aggregate type and gradation significantly affects performance. In preferred embodiments of this invention, crushed stone aggregates having multiple-fractured surfaces provide excellent stability and adhesion. Size-gradation is a matter of choice, depending upon end-use of the pavement as well as the thickness and density required.

It is not intended that the aggregate of this composition be necessarily limited to conventional materials. While the pavement compositions of this invention have been described in terms of graded stones and gravels, other less-typical aggregates are also contemplated, including without limitation, recycled plastics, crushed glass (bottle or otherwise), recycled concrete, and recycled asphaltic pavements. Sufficient aggregate may also be obtained directly from various sources or recycled asphalt roofing waste, primarily commercial roofs.

PREPARATION OF THE COMPOSITIONS

A number of factors must be considered when preparing pavement compositions in accordance with this invention. Among these are the relative amount and gradations of recycled asphalt roofing wastes and aggregate, the type of aggregate, the type of binder, the ratio of binder to roofing waste, the nature of the process equipment available, the order of addition, mixing times, and the overall pavement characteristics and performance properties desired.

In the preparation of the pavement compositions desired herein, blending procedures well-known to those skilled in the art may be employed. Special plant equipment such as binder reaction chambers, attrition mills, injection systems, high-shear blending process plants, and the like are not required. However achieved, thorough and complete blending of all ingredients is essential to ensure homogeneity and high performance.

Pavement compositions may be prepared by incorporating the recycled roofing component into warmed aggregate, then adding the desired amount and type of binder to achieve a formulation best suited for a particular end use. Unlike pavement compositions of the prior art, heated aggregate is not necessary to melt and disperse the recycled roofing waste. The aggregate is heated only to the extent necessary to prevent congealing the asphalt binder when it is later introduced. Preparation in this manner provides a pavement composition exhibiting excellent performance properties, as compared to conventional pavement compositions of the prior art.

A further distinction over the prior art lies in the fact that the asphalt waste described herein may be premixed with the binder material. Dispersion is achieved more homogeneously, and the binder, itself, is performance-modified. The resulting pavement composition demonstrates an enhanced degree of improvement with respect to the engineering properties observed under roadway conditions.

Determining optimum mixed design is critical and is generally considered to encompass the largest possible use of recycled asphalt roofing waste, with the least amount of binder and aggregate, to provide the desired performance properties for a given application. Because asphalt is thermoplastic, a given mix design may perform well in one geographic region, but not another. Selection of an appropriate binder, aggregate, and level of recycled asphalt roofing waste is needed to ensure proper performance.

Field performance, as a test of mix design, is difficult to evaluate. Standardized methods are employed to determine engineering performance properties, as required by various highway authorities. Marshall flow and stability measurements may be obtained if required. Voids contents, densities, and temperature-susceptibilities are also evaluated over a range of compaction levels and test temperatures.

End-use determines, in large part, an appropriate mix design. Varying the quantity and the quality of each component, as detailed in the foregoing discussion, must be considered and can be used to provide a pavement composition with the field performance desired. Pavements are thus designed for particular geographic areas, seasonal weather variations, and the stress-strain demands of vehicular loading.

EXAMPLES OF THE INVENTION

In each of the following examples a pavement composition was prepared by selecting an appropriate aggregate blend and binder, per pavement mix designs authorized by the Pennsylvania Department of Transportation (Florida Department of Transportation, examples 10–12), to which are incorporated recycled asphalt roofing wastes, as described herein. Where indicated, the compositions obtained were prepared for Marshall analysis (50-blow compaction at 285°–310° F.) and evaluated for Marshall stability and flow (force required to produce failure of the specimen at 140° F. and movement in units of 1/100 inches, occurring in the specimen between no-load and maximum load during application). Where made, comparisons are with reference to conventional mix designs formulated without the benefit of recycled roofing wastes.

DEFINITIONS

RARW: Recycled asphalt roofing waste, ReActs-HMA, available from ReClaim, Inc. of Tampa, Fla.; materials processed to a selected size, with foreign contaminants (nails, metal, and like debris) removed, in terms of parts by weight of a composition; size-graded to a range of about 0.21–0.85 mm unless otherwise noted.

Aggregate: Sized according to specific AASHTO- and ASTM- accepted procedures.

Gradations: Determined by a standard roto-tap method using recommended AASHTO and ASTM test procedures.

Marshall Stability: As defined in the foregoing discussion.

Marshall Flow: As defined in the foregoing discussion.

Voids and Mineral Aggregate: The volume of intergranular void space between the aggregate particles of a compacted paving mixture, including air voids and the effective asphalt content, expressed as a percent of the total volume of the sample.

Penetration: As determined by accepted AASHTO and ASTM procedures, at 77° F., 100 g., 5 s.min., in terms of decimillimeters (dmm).

AC: Asphalt cement designation, viscosity, in poise, at 140° F.

RAP: Recycled asphalt pavement, primarily as an aggregate substitute.

EXAMPLE 1

| RARW | 5.0 parts |
|---|---|
| Virgin Asphalt (~AC-15, penetration-100 dmm) | 3.5 parts |
| Aggregate | 91.5 parts |
| Marshall Stability, LBF | 2392 |
| Marshall Flow, 1/100 in. | 8.5 |
| Voids in Mineral Aggregate | 14.8% |
| Voids Filled with Asphalt | 72.0% |

This composition represents a pavement exhibiting excellent Marshall stability, approximately 15% higher than a similar mix design without incorporation of RARW. Marshall Flow is also reduced by approximately 15%, when compared to the same conventional mix design. All other properties are similar and in compliance with Pennsylvania Department of Transportation requirements.

EXAMPLE 2

| RARW | 5 parts |
|---|---|
| Virgin Asphalt (AC-20, penetration-75 dmm) | 5 parts |
| Aggregate | 90 parts |
| Marshall Stability, LBF | 2483 |
| Marshall Flow, 1/100 in. | 8.7 |
| Voids in Mineral Aggregate | 18.0% |
| Voids Filled with Asphalt | 77.1% |

This composition represents a surface (wearing) pavement with even greater Marshall stability than that shown in Exhibit 1: approximately 20% higher than a similar mix design without incorporation of RARW. The corresponding Marshall Flow is approximately 15% less.

EXAMPLE 3

| RARW | 10 parts |
|---|---|
| Virgin Asphalt (AC-20, penetration-75 dmm) | 3.5 parts |
| Aggregate | 86.5 parts |
| Marshall Stability, LBF | 2857 |
| Marshall Flow, 1/100 in. | 8.9 |
| Voids in Mineral Aggregate | 17.8% |
| Voids Filled with Asphalt | 80.1% |

This composition incorporates twice the amount of RARW as those in either Examples 1 or 2 and demonstrates improved performance properties as discussed herein. The Marshall stability is approximately 35% higher that a similar conventional mix design without RARW; the corresponding Marshall Flow is approximately 10% less.

EXAMPLE 4

| RARW (0.85–4.75 mm) | 5 parts |
|---|---|
| Virgin Asphalt (AC-20, penetration-75 dmm) | 3.2 parts |
| Aggregate | 91.5 parts |
| Marshall Stability, LBF | 2167 |
| Marshall Flow, 1/100 in. | 8.5 |
| Voids in Mineral Aggregate | 15.0% |
| Voids Filled with Asphalt | 67.0% |

This composition represents a pavement incorporating a less desirable grad of RARW, outside the preferred gradation range described herein. The composition is otherwise comparable to that represented in Example 1; however, the Marshall stability is less than desirable and demonstrates the importance of RARW gradation when such materials are incorporated into a conventional mix design. Nonetheless, the Marshall stability was still greater than that otherwise observed for a conventional design without RARW.

EXAMPLE 5

| RARW | 5 parts |
|---|---|
| Virgin Asphalt (AC-30, penetration-45 dmm) | 3 parts |
| Aggregate | 92 parts |
| Marshall Stability, LBF | 6100 |
| Marshall Flow, 1/100 in. | 8.5 |
| Voids in Mineral Aggregate | 15.8 |
| Voids Filled with Asphalt | 77.3% |

This composition represents further enhancement of performance properties available through adding the RARW to the asphalt binder in a preliminary mixing step. The Marshall stability is approximately 100% higher than that obtainable through use of conventional asphalt modifiers and nearly 200% higher than that obtainable from a similar mix design without RARW modification. The excellent results observed are all the more unexpected considering use of a rather viscous (low penetration number) asphalt binder.

EXAMPLE 6

| | |
|---|---|
| RARW | 15 parts |
| Virgin Asphalt (AC-40, penetration-30 dmm) | 5 parts |
| Aggregate | 80 parts |

This composition represents use of RARW with an extremely viscous (low penetration) asphalt binder. The amount of RARW and the viscosity of the binder are contrary to the prior art, as are the excellent performance properties obtainable.

EXAMPLE 7

| | |
|---|---|
| RARW | 23 parts |
| Virgin Asphalt (AC-5, penetration-200 dmm) | 3 parts |
| Aggregate | 74 parts |

This composition represents use of a significant amount of RARW in conjunction with a moderately-viscous asphalt binder.

EXAMPLE 8

| | |
|---|---|
| RARW | 28 parts |
| Virgin Asphalt (AC-20, penetration-75 dmm) | 3 parts |
| Aggregate | 69 parts |

This composition represents use of a significantly high level of RARW in conjunction with a viscous asphalt binder, a combination prohibited by and contrary to the prior art.

EXAMPLE 9

| | |
|---|---|
| RARW | 15 parts |
| Virgin Asphalt (AC-20, penetration-75 dmm) | 3 parts |
| Aggregate | 69 parts |

This composition represents use of RARW, at a significant level, with a high-penetration asphalt binder. Excellent performance properties, including stability, flow, and coating, are obtainable.

EXAMPLE 10

| | |
|---|---|
| RARW | 10 parts |
| Virgin Asphalt (AC-20, penetration-75 dmm) | 2.2 parts |
| RAP | 20.0 parts |
| Aggregate | 67.8 parts |
| Marshall Stability, LBF | 2510 |
| Marshall Flow, 1/100 in. | 8.0 |
| Voids in Mineral Aggregate | 17.0% |
| Voids Filled with Asphalt | 76.9% |

This composition incorporates 20 parts RAP and demonstrates improved performances properties. Marchall Stability is approximately 176% higher than that of a similar conventional mix design prepared without RARW. Marshall Flow is 100% higher when compared in the same manner. Recycling or anti-strip agents are not required.

EXAMPLE 11

| | |
|---|---|
| RARW | 10 parts |
| Virgin Asphalt (AC-20, penetration-~75 dmm) | 3.2 parts |
| RAP | 20.0 parts |
| Aggregate | 66.8 parts |
| Marshall Stability, LBF | 3525 |
| Marshall Flow, 1/100 inch | 8 |
| Voids in Mineral Aggregate | 17.7% |
| Voids filled with Asphalt | 78.2% |

This composition incorporates 20 parts RAP and 1 part more virgin asphalt than that in Example 10 and demonstrates the improved performance properties discussed herein. Marshall Stability is approximately 40% higher than that for a composition such as that represented by example 10, and 27% higher than a conventional mix using a 350 poise recycling oil. Flows are similar for both.

EXAMPLE 12

| | |
|---|---|
| RARW | 1.5 parts |
| Virgin Asphalt (AC-20, penetration-~75 dmm) | 3.5 parts |
| RAP | 25.0 parts |
| Aggregate | 70.0 parts |
| Marshall Stability, LBF | 1425 |
| Marshall Flow, 1/100 inch | 6.0 |
| Voids in Mineral Aggregate | 16.2% |
| Voids filled with Asphalt | 66.8% |

This composition demonstrates use of RARW premixed in an asphalt binder. The mix also includes RAP. The performance properties show improvement over a similar mix design not containing RARW. Marshall Stability is approximately 40% greater and flow is approximately 50% greater.

While the principles of this invention have been described in connection with specific embodiments, it should be understood clearly that these descriptions are made only by way of example and are not intended to limit the scope of the invention. For example, the pavement compositions discussed herein may be used in Stone Mastic Asphalt (SMA) gap-graded designs, which are formulated to provide stone-on-stone contact of aggregate, bound by a temperature-stable, low-penetration asphalt, filler, and stabilizing fiber. The recycled asphalt component of this invention is ideally suited to meet the high-asphalt, low-voids requirements of an SMA mix. With either an SMA or conventional mix, certain, limited applications may contemplate use of additional filler and/or fiber, although it is anticipated that the roofing waste includes sufficient filler and fiber to meet any reasonably-required level of performance.

What is claimed is:

1. In an asphalt pavement composition of the type including aggregate and asphaltic bitumen, the improvement comprising:
   about 3-8 parts by weight asphaltic bitumen binder;
   about 62-96 parts by weight aggregate; and
   about 0.5-30 parts by weight recycled roofing waste as a predominate source of asphalt, stabilizing filler and reinforcing fiber, such that pavement performance is enhanced.

2. The composition of claim 1 wherein the roofing waste is about 2-15 parts by weight of the composition.

3. The composition of claim 2 wherein the roofing waste is size-graded to a dimension less than about 1.0 mm.

4. The composition of claim 3 wherein the roofing waste is size-graded to a range of about 0.21-0.85 mm.

5. The composition of claim 4 wherein the roofing waste comprises about 5-15 percent by weight fiber and about 40-70 percent by weight filler.

6. The composition of claim 5 wherein the roofing waste is the dominant source of filler and fiber.

7. The composition of claim 6 wherein the roofing waste is substantially the only source of filler and fiber.

8. The composition of claim 1 wherein the asphaltic bitumen has a penetration number in a range of about 15-200.

9. The composition of claim 8 wherein the asphaltic bitumen has a penetration number in a range of about 20-50.

10. The composition of claim 9 wherein the roofing waste is about 2-15 parts by weight of the composition.

11. The composition of claim 10 wherein the roofing waste is size-graded to a dimension less than about 1.0 mm.

12. The composition of claim 11 wherein the roofing waste is size-graded to a range of about 0.21-0.85 mm.

13. The composition of claim 12 wherein the roofing waste comprises about 5-15 percent by weight fiber and about 40-70 percent by weight filler.

14. The composition of claim 13 wherein the roofing waste is the dominant source of filler and fiber.

15. The composition of claim 14 wherein the roofing waste is substantially the only source of filler and fiber.

16. The composition of claim 1 wherein the aggregate is crushed stone.

17. The composition of claim 16 wherein the crushed stone is sized-graded to a dimension less than about 19.0 mm.

* * * * *

UNITED STATES PATENT AND TRADEMARK OFFICE
CERTIFICATE OF CORRECTION

PATENT NO. : 5,217,530
DATED : June 8, 1993
INVENTOR(S) : Ken F. Grzybowski

It is certified that error appears in the above-indentified patent and that said Letters Patent is hereby corrected as shown below:

In column 11, lines 45-50, delete the table of Example 9 and replace it with the following:

EXAMPLE 9

| | |
|---|---|
| RARW | 15 parts |
| Virgin Asphalt ($^-$AC-2.5, penetration-250+ dmm) | 4 parts |
| Aggregate | 81 parts |

Signed and Sealed this

Thirty-first Day of May, 1994

Attest:

BRUCE LEHMAN

Attesting Officer      Commissioner of Patents and Trademarks